(12) United States Patent
Kim (10) Patent No.: US 8,397,850 B2
(45) Date of Patent: Mar. 19, 2013

(54) SYSTEM AND METHOD FOR DRIVING HYBRID ELECTRIC VEHICLE

(76) Inventor: Chan-sik Kim, Seoul (KR)

( * ) Notice: Subject to any disclaimer, the term of this patent is extended or adjusted under 35 U.S.C. 154(b) by 422 days.

(21) Appl. No.: 12/742,311

(22) PCT Filed: Nov. 10, 2008

(86) PCT No.: PCT/KR2008/006609
§ 371 (c)(1),
(2), (4) Date: May 11, 2010

(87) PCT Pub. No.: WO2009/064092
PCT Pub. Date: May 22, 2009

(65) Prior Publication Data
US 2010/0258366 A1    Oct. 14, 2010

(30) Foreign Application Priority Data
Nov. 13, 2007  (KR) .................. 10-2007-0115739

(51) Int. Cl.
*B60K 6/20* (2007.10)
(52) U.S. Cl. ..................... 180/65.31; 180/165
(58) Field of Classification Search .............. 180/15, 180/16, 65.31, 65.6, 165; 318/546; 310/104, 310/105, 106, 107, 108, 109, 110
See application file for complete search history.

(56) References Cited

U.S. PATENT DOCUMENTS

| | | | |
|---|---|---|---|
| 3,502,165 A | * | 3/1970 | Matsukata ............... 180/23 |
| 5,680,907 A | * | 10/1997 | Weihe ................... 180/2.2 |
| 6,186,255 B1 | | 2/2001 | Shimasaki et al. |
| 6,841,909 B2 | * | 1/2005 | Six ...................... 310/103 |
| 7,325,637 B2 | * | 2/2008 | Sadarangani ........... 180/65.31 |
| 7,547,980 B2 | * | 6/2009 | Harrison ................ 290/1 R |

FOREIGN PATENT DOCUMENTS

| | | |
|---|---|---|
| JP | 11-125328 | 5/1999 |
| KR | 10-1997-0074418 | 12/1997 |
| KR | 10-2006-0081780 | 7/2006 |
| KR | 10-2006-0087412 | 8/2006 |

OTHER PUBLICATIONS

International Search Report—PCT/KR2008/006609 dated Jun. 25, 2009.

* cited by examiner

*Primary Examiner* — John Walters
(74) *Attorney, Agent, or Firm* — Cantor Colburn LLP (57) ABSTRACT

Disclosed are a driving system and method of a hybrid electric vehicle. The hybrid electric vehicle driving system includes a generator to generate electric energy from rotating power input thereto, and an electric motor to generate rotating power from electric energy supplied thereto. An auxiliary drive wheel is movably provided to be raised or lowered. When being lowered, the auxiliary drive wheel is rotated in contact with the ground surface, to provide the generator with rotating power generated upon rotation thereof. A power distributor is provided to distribute the rotating power generated from the electric motor or auxiliary drive wheel, so as to provide the generator with regenerative energy, or to provide a drive wheel with rotating power. A control unit controls distribution of the rotating power by controlling the supply of electric current to the power distributor.

4 Claims, 10 Drawing Sheets

Fig. 1

*PRIOR ART*

PRIOR ART

*PRIOR ART*

SYSTEM AND METHOD FOR DRIVING HYBRID ELECTRIC VEHICLE

BACKGROUND OF THE INVENTION

1. Field of the Invention

The present invention relates to a system and method for driving a hybrid electric vehicle, and more particularly, to a driving system and driving method of a hybrid electric vehicle, wherein driving of a hybrid electric vehicle is controlled according to a determined traveling mode.

2. Description of the Related Art

A Hybrid Electric Vehicle (HEV) refers to a vehicle using driving force outputs of both an internal combustion engine and an electric motor. As compared to a typical vehicle equipped with only an internal combustion engine, such a hybrid electric vehicle is able to remarkably reduce the amount of exhaust gas and thus, is usually referred to as an "eco car".

Figure 1:
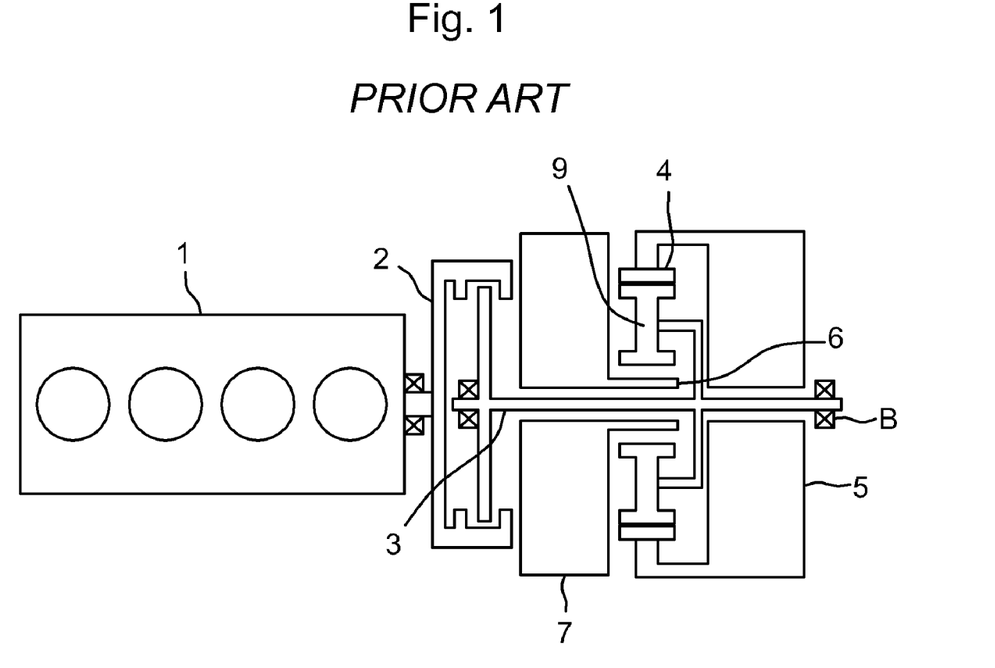
FIG. 1 is a view illustrating the configuration of a power train of a conventional hard-type hybrid electric vehicle.

FIG. 1 is a view illustrating the configuration of a power train of a conventional hard-type hybrid electric vehicle.

Referring to FIG. 1, the power train of the conventional hybrid electric vehicle includes an internal combustion engine 1, an engine clutch 2 connected to an output end of the internal combustion engine 1, a carrier gear 3 connected to the engine clutch 2, a sun gear 6 connected to a generator 7, a ring gear 4 connected to an electric motor 5, and pinion gears 9 connected to the ring gear 4, sun gear 6 and carrier gear 3. Here, the electric motor 5 and generator 7 may take an Integrated Starter & Generator (ISG) configuration capable of simultaneously achieving power generation and transmission. In the drawing, reference character B represents a bearing.

Generally, the conventional hybrid electric vehicle includes a Hybrid Control Unit (HCU) to control operations of the internal combustion engine 1, generator 7 and electric motor 5 according to a traveling mode of the vehicle, in order to allow the hybrid electric vehicle to be driven while maintaining an optimum state thereof. Here, traveling modes of the driving system of the conventional hybrid electric vehicle may be classified into a Hybrid Electric Vehicle (HEV) mode, an Electric Vehicle (EV) mode and a maximum (MAX) torque mode, according to a required torque, the State of Charge (SOC) of a battery, and the like. The HEV mode is a traveling mode wherein the HCU drives the hybrid electric vehicle using both the internal combustion engine 1 and the electric motor 5. In the EV mode, only the electric motor 5 is operated by power of a battery. In the MAX torque mode, the hybrid electric vehicle is driven by both the internal combustion engine 1 and the electric motor 5 in such a manner that, if a required torque is not fulfilled by the HEV mode, the internal combustion engine 1 is operated at a maximum torque, and the remaining part of the required torque is fulfilled by the electric motor 5. In addition, the hybrid electric vehicle may be driven in a regeneration mode, wherein the battery is charged while a braking force is applied to the vehicle.

FIGS. 2 to 5 are views illustrating power transmission relationship for different traveling modes of the conventional hybrid electric vehicle.

Figure 2:
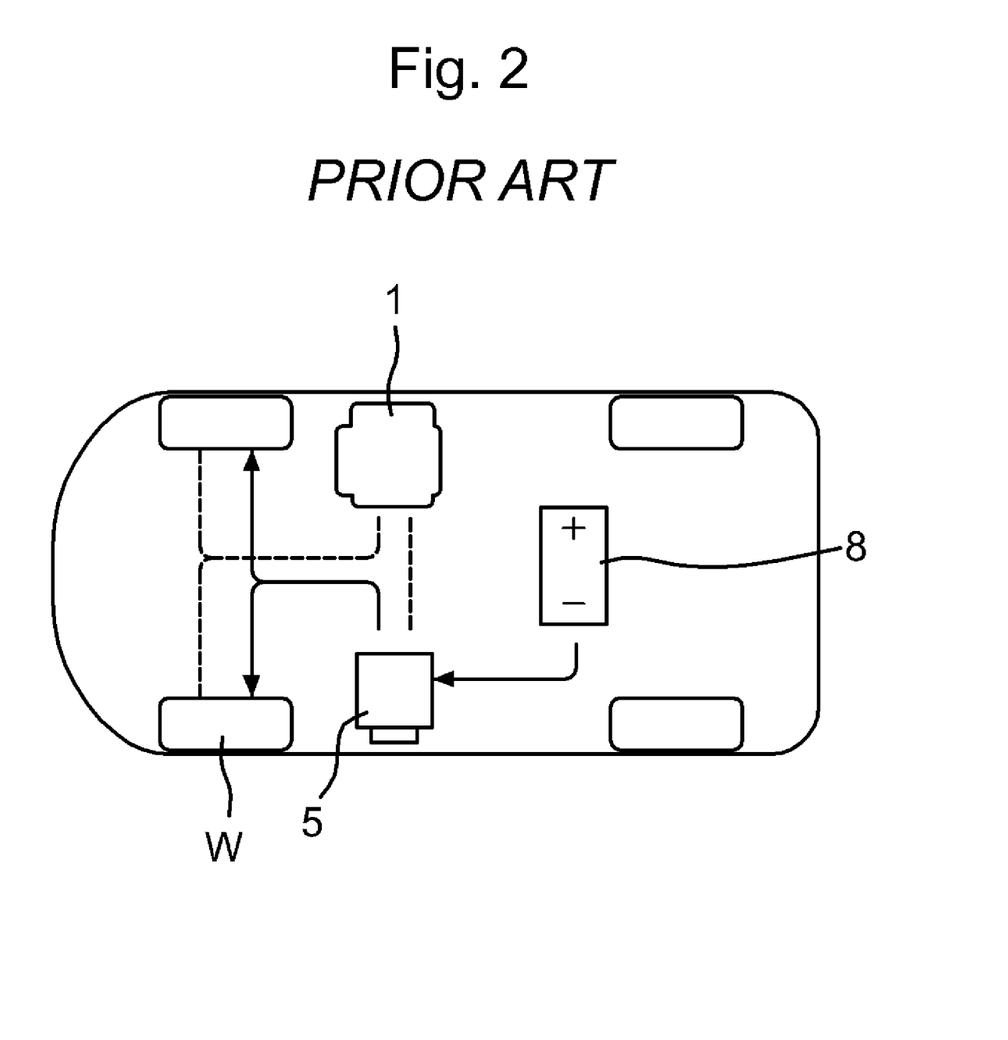
FIGS. 2 to 5 are views illustrating power transmission relationship for different traveling modes of the conventional hybrid electric vehicle.
Figure 3:
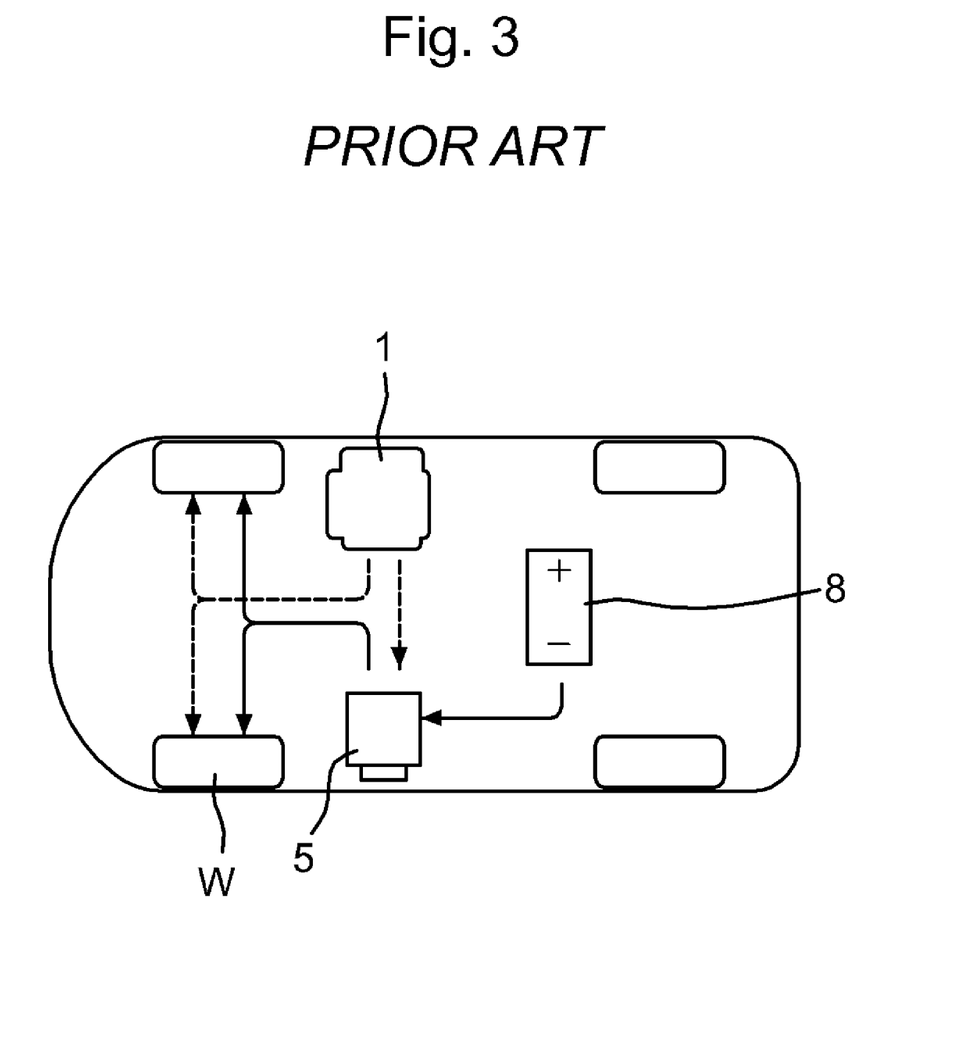
Figure 4:
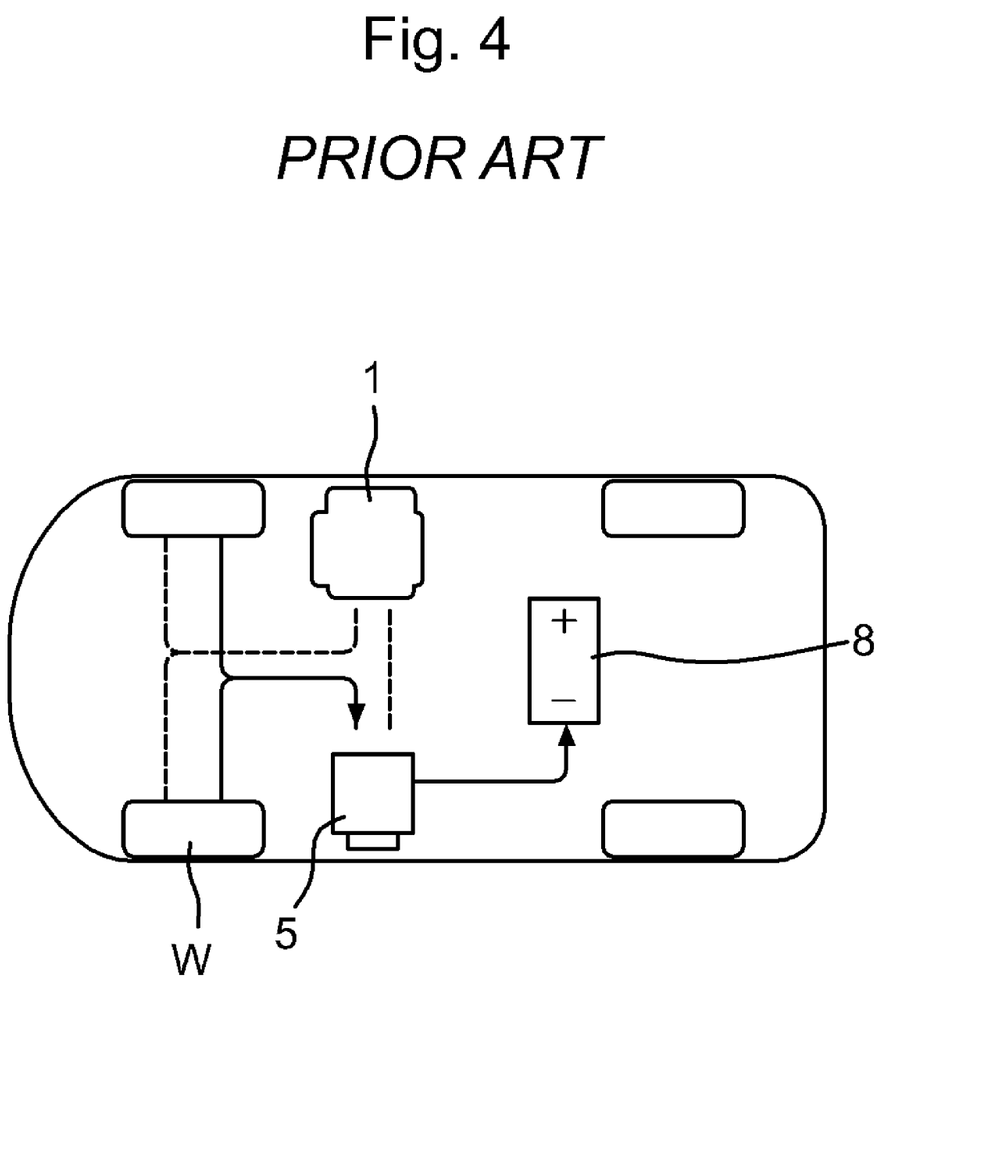
Figure 5:
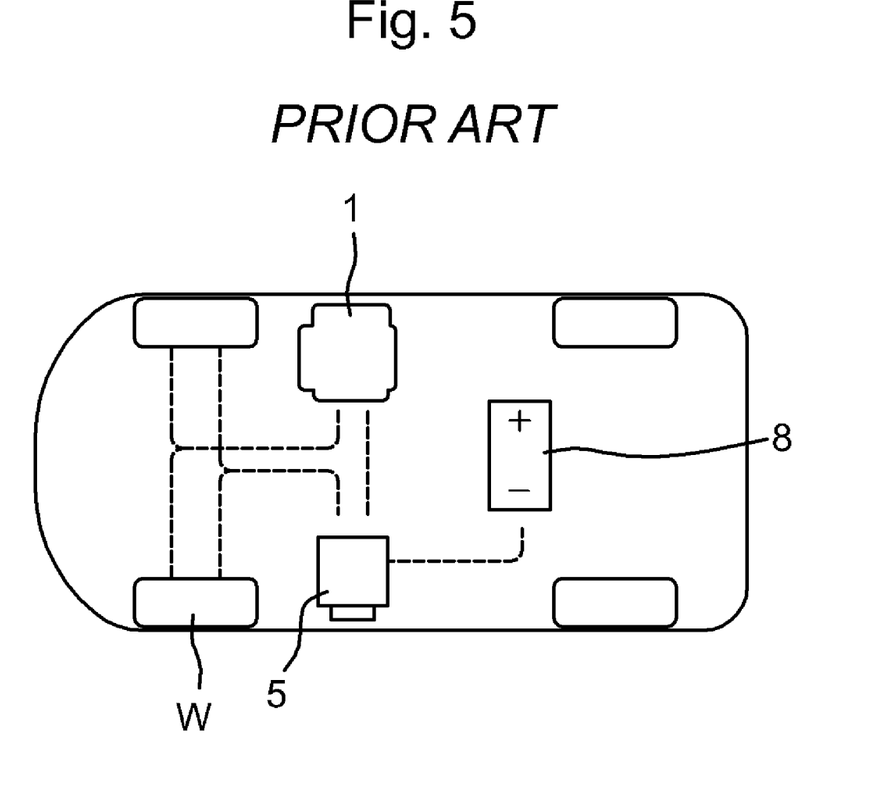

The conventional hybrid electric vehicle is able to be driven, in different traveling modes selected according to driving speeds thereof, under operation of the driving system. More specifically, upon start or low-speed traveling of the hybrid electric vehicle, as shown in FIG. 2, drive wheels W of the hybrid electric vehicle are rotated by a driving force output from the electric motor 5 as the electric motor 5 receives electric power from a battery 8. During typical traveling, as shown in FIG. 3, the hybrid electric vehicle is driven via combination of the internal combustion engine 1 and the electric motor 5 according to a driving speed thereof. In particular, upon high-speed traveling, the drive wheels W of the hybrid electric vehicle are rotated by driving force outputs from both the internal combustion engine 1 and the electric motor 5 in such a manner that power from the electric motor 5 assists power of the internal combustion engine 1. In addition, When the hybrid electric vehicle is reduced in driving speed, as shown in FIG. 4, recovery of energy is possible as the battery 8 is charged using the electric motor 5 as a generator. Upon stoppage of the hybrid electric vehicle, as shown in FIG. 5, operations of both the internal combustion engine 1 and the electric motor 5 are automatically stopped, reducing unnecessary fuel consumption and emission of exhaust gas.

Additionally, with the HCU of the conventional hybrid electric vehicle, electric power is able to be generated via the generator 7 using a braking force that is applied by both the internal combustion engine 1 and the electric motor 5 when the hybrid electric vehicle is reduced in driving speed. The battery 8 is charged with the generated electric power. For reference, energy to be used by the generator 7 for generation of electric power is referred to as regenerative energy.

SUMMARY OF THE INVENTION

Therefore, the present invention has been made in view of the above problems, and it is an object of the present invention to provide a driving system and driving method of a hybrid electric vehicle, which can increase the use efficiency of regenerative energy and assure fabrication of simplified configurations of an internal combustion engine, an electric motor and a power train connected therewith.

It is another object of the present invention to provide a driving system and driving method of a hybrid electric vehicle, which can generate electric power without additional fuel consumption.

It is a further object of the present invention to provide a driving system and driving method of a hybrid electric vehicle, which can achieve appropriate distribution of driving energy and regenerative energy, on the basis of driving conditions of the vehicle, such as a vehicle weight, driving speed, driving acceleration, and the like, traveling modes, and road conditions, thereby enabling simultaneous implementation of power generation and vehicle driving.

In accordance with one aspect of the present invention, the above and other objects can be accomplished by the provision of a driving system of a hybrid electric vehicle comprising: a generator to generate electric energy from rotating power input thereto; an electric motor to generate rotating power from electric energy supplied thereto; a power distributor to distribute the rotating power, so as to provide the generator with a part of the rotating power; and a control unit to control distribution of the rotating power by controlling the supply of electric current to the power distributor.

The power distributor may include: an electromagnet to create a magnetic field upon receiving the electric current, the electromagnet being adapted to receive the rotating power generated from the electric motor; and a permanent magnet to be rotated according to rotation of the electromagnet to thereby receive the rotating power from the electromagnet and input the rotating power to the generator.

The driving system may further comprise: an auxiliary drive wheel movably installed to be raised or lowered, the lowered auxiliary drive wheel being rotated in contact with the ground surface to provide the generator with rotating power generated upon rotation of the auxiliary drive wheel. Here, the generator may transmit the rotating power, generated by the auxiliary drive wheel, to the power distributor, and the power distributor may combine the rotating power generated by the auxiliary drive wheel with the rotating power generated by the electric motor, to rotate a drive wheel using the combined rotating power.

The power distributor may include: a permanent magnet adapted to receive the rotating power generated by the generator and also, adapted to transmit the rotating power, generated by the electric motor, to the generator; and an electromagnet adapted to receive the rotating power generated by the generator via the permanent magnet by being rotated according to rotation of the permanent magnet and also, adapted to transmit the rotating power, generated by the electric motor, to the permanent magnet, the electromagnet serving to combine the rotating power from the auxiliary drive wheel with the rotating power from the electric motor, to rotate the drive wheel using the combined rotating power. The auxiliary drive wheel may be lowered upon operation of a brake or when the vehicle is driving on a downward slope under the control operation of the control unit.

In accordance with another aspect of the present invention, there is provided a driving method of a hybrid electric vehicle, to control an auxiliary drive wheel movably installed to be raised or lowered, the lowered auxiliary drive wheel being rotated in contact with the ground surface to provide a generator with rotating power generated upon rotation of the auxiliary drive wheel, the method comprising: lowering the auxiliary drive wheel upon operation of a brake, and raising the auxiliary drive wheel when the operation of the brake is stopped or the driving of the vehicle is stopped; and lowering the auxiliary drive wheel when the vehicle is driving on a downward slope.

In the driving system and driving method of a hybrid electric vehicle according to the present invention, with the use of the power distributor, appropriate energy distribution between the generator and the electric motor can be accomplished, achieving enhancement in the use efficiency of regenerative energy. This also has the effect of enabling fabrication of simplified configurations of the internal combustion engine, electric motor and a power train connected therewith.

Further, according to the present invention, generation of electric power via the auxiliary drive wheel does not require further consumption of fuel, resulting in increased fuel economy.

Furthermore, according to the present invention, a traveling mode of the vehicle can be accurately controlled on the basis of accurately sensed driving conditions of the vehicle, such as a vehicle weight, driving speed, driving acceleration, and the like, and environmental road conditions. Moreover, when distributing driving energy and regenerative energy based on combination of the sensed driving conditions and traveling mode, power generation and vehicle driving can be simultaneously implemented in an appropriate manner according to a traveling mode of the vehicle. This results in a reduction in the consumption of fuel and in particular, can improve energy efficiency when the vehicle is driving on a slope.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, a driving system and driving method of a hybrid electric vehicle in accordance with preferred embodiments of the present invention will be described in detail with reference to the accompanying drawings.

Figure 6:
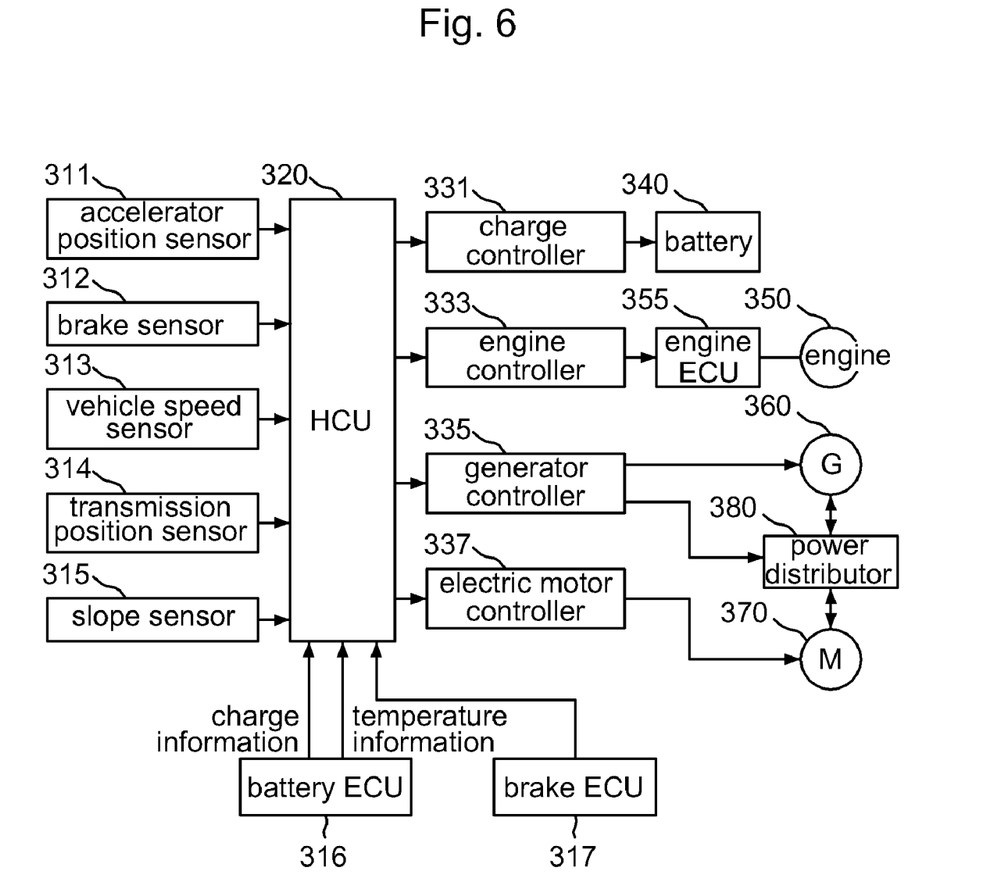
FIG. 6 is a block diagram illustrating the configuration of a driving system of a hard-type hybrid electric vehicle in accordance with a preferred embodiment of the present invention.
Figure 7:
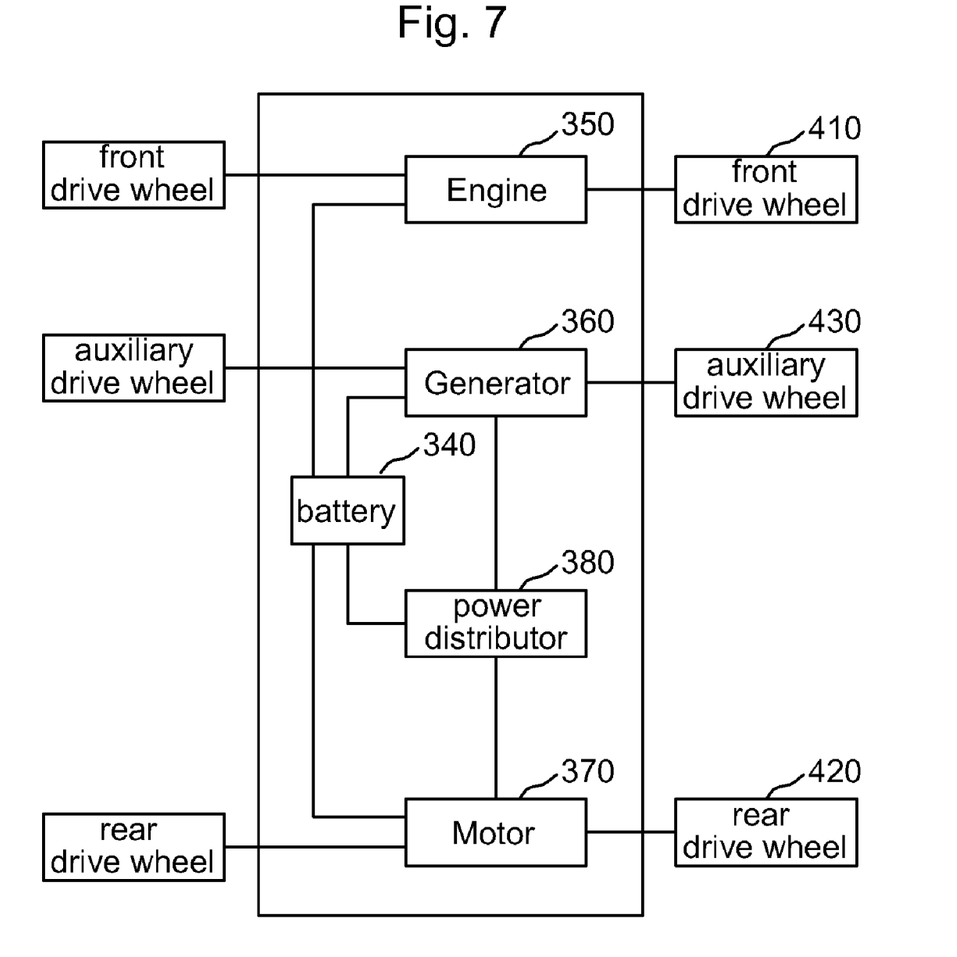
FIG. 7 is a block diagram illustrating the configuration of a power train of the hard-type hybrid electric vehicle in accordance with the present invention.

FIG. 6 is a block diagram illustrating the configuration of a driving system of a hard-type hybrid electric vehicle in accordance with a preferred embodiment of the present invention, and FIG. 7 is a block diagram illustrating the configuration of a power train of the hard-type hybrid electric vehicle in accordance with the present invention.

Referring to FIGS. 6 and 7, the hybrid electric vehicle driving system in accordance with the present invention includes an accelerator position sensor 311, a brake sensor 312, a vehicle speed sensor 313, a transmission position sensor 314, a slope sensor 315, a battery Electrical Control Unit (ECU) 316, a brake ECU 317, a Hybrid Control Unit (HCU) 320, a charge controller 331, an engine controller 333, a generator controller 335, an electric motor controller 337, a battery 340, an internal combustion engine 350, an engine ECU 355, a generator 360, an electric motor 370, and a power distributor 380.

The accelerator position sensor 311 is used to sense a position of an accelerator pedal, to thereby output the sensed result as an electric signal. The brake sensor 312 is used to sense operation of a brake, to thereby output the sensed result as an electric signal. The vehicle speed sensor 313 is used to sense the speed of the vehicle, to thereby output the sensed result as an electric signal. The transmission position sensor 314 is used to sense a position of a transmission, to thereby output the sensed results as an electric signal. In addition, the slope sensor 315 is used to sense an inclination of the vehicle on a slope, to thereby output the sensed result as an electric signal.

The battery ECU 316 provides information about the State of Charge (SOC) of the battery 340, and the brake ECU 317 provides information about braking conditions.

The HCU 320 serves to control general operations of the hybrid electric vehicle driving system 300 in accordance with the present invention. Specifically, the HCU 320 is able to control the charge controller 331, engine controller 333, generator controller 335 and electric motor controller 337, respectively, in response to the electric signals output or provided from the accelerator position sensor 311, brake sensor 312, vehicle speed sensor 313, transmission position sensor 314, slope sensor 315, battery ECU 316 and brake ECU 317.

The charge controller 331 is used to control the State of Charge of the battery 340. The battery 340 provides not only electric power required to operate the electric motor 370, but also electric current to create a magnetic field in the power distributor 380.

The engine controller 333 outputs a control signal to control the internal combustion engine 350 under the control operation of the HCU 320, and in turn, the engine ECU 355 controls the internal combustion engine 350 under the control operation of the engine controller 333. Thereby, the internal combustion engine 350 is able to generate rotating power required to rotate front drive wheels 410 of the hybrid electric vehicle using fuel energy.

The generator controller 335 outputs a control signal to control the generator 360 under the control operation of the HCU 320. The generator 360 is able to generate electric energy, in response to the control signal output from the generator controller 335, using rotating power of auxiliary drive wheels 430 or the electric motor 370 distributed from the power distributor 380. The battery 340 is charged with the generated electric energy.

The electric motor controller 337 outputs a control signal to control the electric motor 370 under the control operation of the HCU 320. The electric motor 370 is able to generate rotating power using the electric energy output from the battery 340 in response to the control signal output from the electric motor controller 337.

Figure 8:
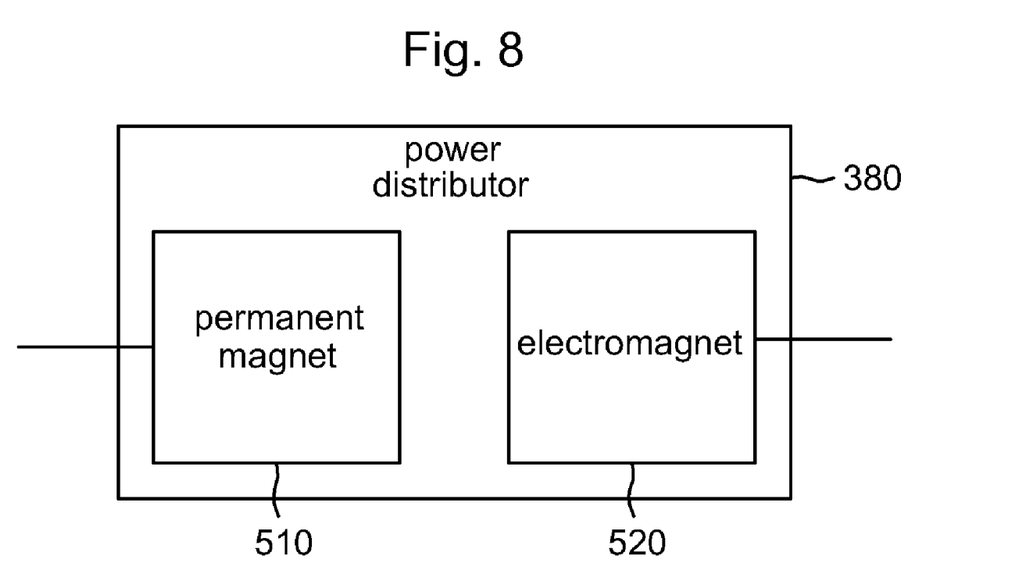
FIG. 8 is a view illustrating the configuration of a power distributor provided in the hybrid electric vehicle driving system in accordance with a preferred embodiment of the present invention.

FIG. 8 is a view illustrating the configuration of the power distributor provided in the hybrid electric vehicle driving system in accordance with a preferred embodiment of the present invention.

Referring to FIG. 8, the power distributor 380 serves to distribute rotating power generated from the electric motor 370 and rotating power generated from the auxiliary drive wheels 430, to provide the generator 360 with regenerative energy, or to provide rear drive wheels 420 with rotating power. More specifically, if the power distributor 380 receives power output from the generator 360 and power output from the electric motor 370, the power distributor 380 may distribute the power to the rear drive wheels 420 so as to rotate the rear drive wheels 420, or may provide the generator 360 with the power output from the electric motor 370, allowing the power to be used as regenerative energy. For this, the power distributor 380 includes a permanent magnet 510 and an electromagnet 520.

The permanent magnet 510 serves to transmit or receive the power to or from the generator 360. That is, the permanent magnet 510 is rotated upon receiving the rotating power output from the generator 360. In this case, if electric current flows through the electromagnet 520 under the control operation of the generator controller 335, a magnetic field is created around the electromagnet 520, allowing the electromagnet 520 to be rotated according to rotation of the permanent magnet 510. As the electromagnet 520 is rotated, rotating power of the electromagnet 520 is combined with the rotating power output from the electric motor 370, thereby being used to rotate the rear drive wheels 420.

The electromagnet 520 is able to create the magnetic field when the electric current, output from the battery 340, flows through the electromagnet 520 under the control operation of the generator controller 335. In this case, a direction of magnetic polarity of the electromagnet 520 is changed according to a flow direction of electric current. Also, with a change in the direction of magnetic polarity, the electromagnet 520 may be rotated in the same direction as a rotating direction of the permanent magnet 510, or may be rotated in an opposite direction of the rotating direction of the permanent magnet 510.

The rotating power generated from the electric motor 370 may be transmitted to the rear drive wheels 420 via gears and to the electromagnet 520. If the rotating power from the electric motor 370 is transmitted to the electromagnet 520, the electromagnet 520 is rotated. In this case, if electric current flows through the electromagnet 520 under the control operation of the generator controller 335, the electromagnet 520 creates a magnetic field, causing the permanent magnet 510 to be rotated by the magnet field simultaneously with rotation of the electromagnet 520. That is, rotating power of the electromagnet 520 is transmitted to the permanent magnet 510 and in turn, the permanent magnet 510 transmits the rotating power to the generator 360, allowing the rotating power to be used as regenerative energy. The generator 360 is able to generate electric energy using the rotating power transmitted via the permanent magnet 510.

The auxiliary drive wheels 430 are able to be lowered to come into contact with the ground surface and also, are able to be again raised, under the control operation of the generator controller 335. When the auxiliary drive wheels 430 are lowered to come into contact with the ground surface, the auxiliary drive wheels 430 are rotated at the driving speed of the vehicle. Rotating power generated during rotation of the auxiliary drive wheels 430 is transmitted to the generator 360. Thereby, under the control operation of the generator controller 335, the generator 360 may generate electric energy using the rotating power transmitted from the auxiliary drive wheels 430, or may transmit the rotating power of the auxiliary drive wheels 430 to the permanent magnet 510.

In the case where the rotating power from the auxiliary drive wheels 430 is transmitted to the permanent magnet 510, the permanent magnet 510 is rotated. With rotation of the permanent magnet 510, as described above, the resulting rotating power is transmitted to the rear drive wheels 420 via the electromagnet 520 under the control operation of the generator controller 335.

Figure 9:
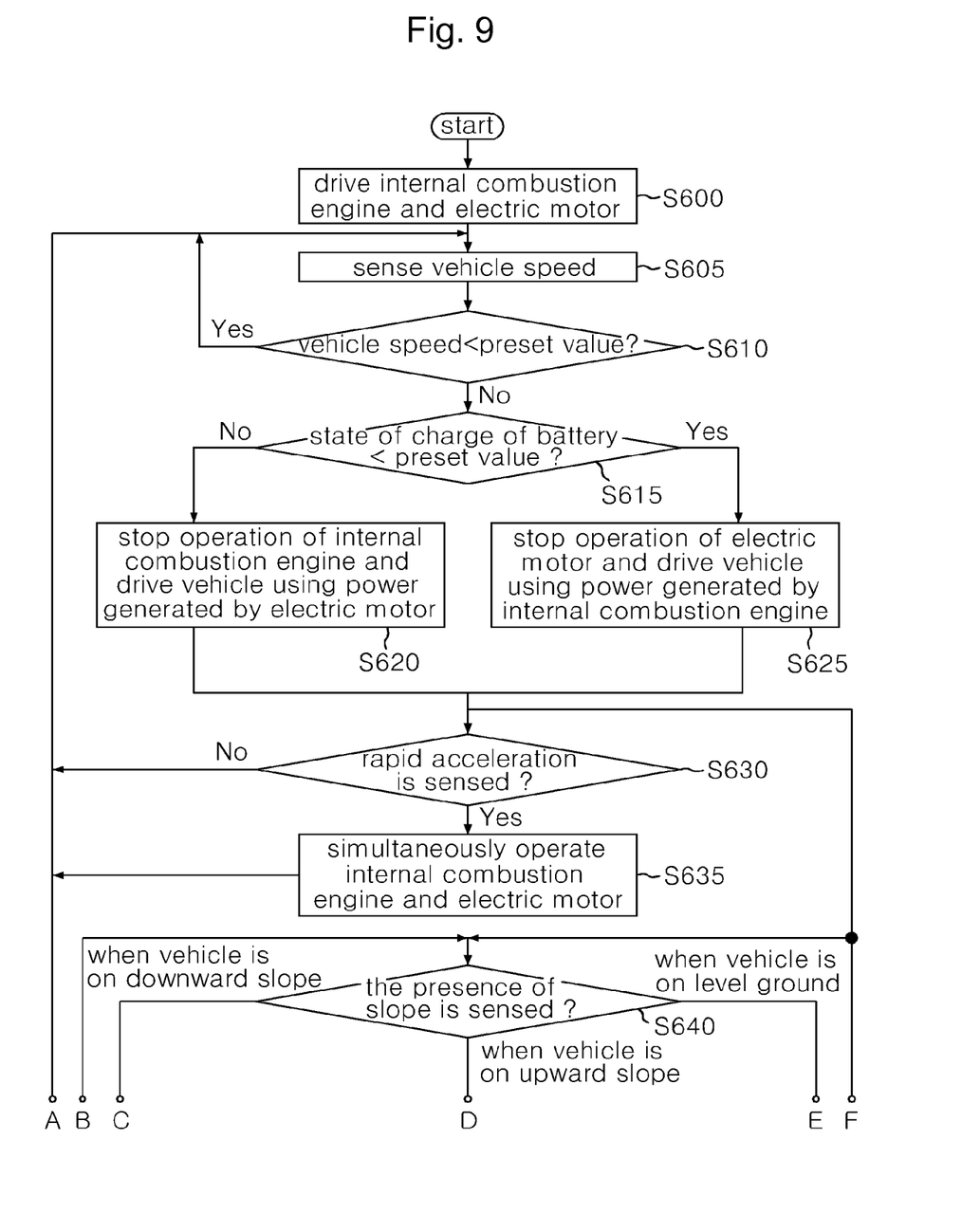
FIG. 9 is a flow chart illustrating the implementation sequence of a driving method of a hybrid electric vehicle in accordance with a preferred embodiment of the present invention.

FIG. 9 is a flow chart illustrating the implementation sequence of a driving method of a hybrid electric vehicle in accordance with a preferred embodiment of the present invention.

Referring to FIG. 9, if a command to start driving of the vehicle is input, the HCU 320 controls the engine controller 333 and electric motor controller 337, causing operations of the internal combustion engine 350 and electric motor 370 (S600). The vehicle speed sensor 313 senses a driving speed of the vehicle and outputs the sensed result as an electric signal (S605). The HCU 320 determines, on the basis of the electric signal output from the vehicle speed sensor 313, whether or not the speed of the vehicle reaches a preset value (S610). Here, the preset value may be set or changed by a vehicle driver or manufacturer. For example, the preset value is preferably 60 km/s.

If the driving speed of the vehicle is greater than the preset value, the HCU 320 judges the State of Charge of the battery 340, on the basis of information about the battery provided by the battery ECU 316 (S615). If the State of Charge of the battery 340 is greater than a preset value, the HCU 320 controls the engine controller 333 to stop operation of the internal combustion engine 350 and also, controls the electric motor controller 337 to continuously operate the electric motor 370, allowing the vehicle to be driven by electric power generated by the electric motor 370 (S620). Here, the preset value of the State of Charge may be set or changed by a vehicle driver or manufacturer. For example, the preset value of the State of Charge is preferably greater than a half the total capacity of the battery.

If the State of Charge of the battery 340 is less than the preset value, the HCU 320 controls the electric motor controller 337 to stop operation of the electric motor 370 and also, controls the engine controller 333 to continuously operate the internal combustion engine 350, allowing the vehicle to be driven by power generated by the internal combustion engine 350 (S625).

The HCU 320 functions to determine the presence of rapid acceleration on the basis of a signal output from the accelerator position sensor 331 that is used to sense a position of the accelerator pedal (S630). If the rapid acceleration is sensed, the HCU 320 controls the engine controller 333 and electric motor controller 337, causing simultaneous operation of both the internal combustion engine 350 and electric motor 370 (S635).

The HCU 320 also functions to determine the presence of the slope on the basis of a signal output from the slope sensor 315 (S640). If the slope is an upward slope, the HCU 320 controls the engine controller 333 and electric motor controller 337, to simultaneously operate the internal combustion engine 350 and electric motor 370 (S645).

If the slope is a downward slope, the HCU 320 controls the generator controller 335 to lower the auxiliary drive wheels 430 such that the auxiliary drive wheels 430 come into contact with the ground surface and also, controls the engine controller 333, to stop operation of the internal combustion engine 350 (S650). When the auxiliary drive wheels 430 come into contact with the ground surface, the auxiliary drive wheels 430 are rotated at the driving speed of the vehicle, and resulting rotating power of the auxiliary drive wheels 430 is transmitted to the generator 360 as described above. The HCU 320 controls the generator controller 335, causing the generator 360 to generate electric energy using the rotating power transmitted from the auxiliary drive wheels 430. Here, the electric energy generated from the generator 360 may be used to charge the battery 340, or may be supplied, as operating power, to the electric motor 370.

If the vehicle is driving on level ground and the auxiliary drive wheels 430 come into contact with the ground surface, the HCU 320 controls the generator controller 335, to raise the auxiliary drive wheels 430.

The HCU 320 further functions to determine the presence of brake operation on the basis of a signal output from the brake sensor 312 that is used to sense operation of a brake (S665). If the operation of the brake is sensed, the HCU 320 controls the generator controller 335 to lower the auxiliary drive wheels 430, causing the auxiliary drive wheels 430 to come into contact with the ground surface. Simultaneously, the HCU 320 controls the engine controller 333, to stop operation of the internal combustion engine 350 (S670). The auxiliary drive wheels 430, which come into contact with the ground surface, are rotated at the driving speed of the vehicle, and resulting rotating power of the auxiliary drive wheels 430 is transmitted to the generator 360 as described above. The HCU 320 controls the generator controller 335, causing the generator 360 to generate electric energy using the rotating power transmitted from the auxiliary drive wheels 430 (S675). Here, the electric energy generated by the generator 360 may be used to charge the battery 340, or may be supplied, as operating power, to the electric motor 370.

If no operation of the brake is sensed and the auxiliary drive wheels 430 are in a lowered position, the HCU 320 controls the generator controller 335, to raise the auxiliary drive wheels 430 (S680).

If the brake is deeply depressed and the driving of the vehicle is stopped, the HCU 320 controls the generator controller 335 to raise the auxiliary drive wheels 430, and also, controls the engine controller 333 and generator controller 335, to stop operations of the internal combustion engine 350 and electric motor 370 (S685).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As apparent from the above description, the present invention provides a driving system and driving method of a hybrid electric vehicle, which are available to the automobile industry, and more particularly, are applicable to Hybrid Electric Vehicles (HEVs), in order to effectively control the driving of the HEVs while reducing consumption of fuel required for driving.

What is claimed is:

1. A driving system of a hybrid electric vehicle comprising:
    a generator to generate electric energy from rotating power input thereto;
    an electric motor to generate rotating power from electric energy supplied thereto;
    a power distributor to distribute the rotating power, so as to provide the generator with a part of the rotating power;
    a control unit to control distribution of the rotating power by controlling the supply of electric current to the power distributor; and
    an auxiliary drive wheel movably installed to be raised or lowered, the auxiliary drive wheel when lowered, being rotated in contact with a ground surface to provide the generator with rotating power generated upon rotation of the auxiliary drive wheel,
    wherein the generator transmits the rotating power, generated by the auxiliary drive wheel, to the power distributor, and
    wherein the power distributor combines the rotating power generated by the auxiliary drive wheel with the rotating power generated by the electric motor, to rotate a drive wheel using the combined rotating power.

2. The driving system according to claim 1, wherein the power distributor includes:
    an electromagnet to create a magnetic field upon receiving the electric current, the electromagnet being adapted to receive the rotating power generated from the electric motor; and
    a permanent magnet to be rotated according to rotation of the electromagnet to thereby receive the rotating power from the electromagnet and input the rotating power to the generator.

3. The driving system according to claim 1, wherein the power distributor includes:
    a permanent magnet adapted to receive the rotating power generated by the generator and also, adapted to transmit the rotating power, generated by the electric motor, to the generator; and
    an electromagnet adapted to receive the rotating power generated by the generator via the permanent magnet by being rotated according to rotation of the permanent magnet and also, adapted to transmit the rotating power, generated by the electric motor, to the permanent magnet, the electromagnet serving to combine the rotating power from the auxiliary drive wheel with the rotating power from the electric motor, to rotate the drive wheel using the combined rotating power.

4. The driving system according to claim 1, wherein the auxiliary drive wheel is lowered upon operation of a brake or when the vehicle is driving on a downward slope under the control operation of the control unit.

\* \* \* \* \*